US012732735B2

(12) United States Patent
Nielsen et al.

(10) Patent No.: US 12,732,735 B2
(45) Date of Patent: Sep. 8, 2026

(54) EARPHONE SYSTEM

(71) Applicants: SONICEDGE LTD., Shoham (IL); JACOB JENSEN DESIGN A/S, Hoejslev (DK)

(72) Inventors: Jakob Kjær Nielsen, Løgstrup (DK); Luca Brazzale, Skive (DK); Giacomo Mantefalcone, Rome (IT); Sagi Chen, Haifa (IL); Ari Mizrachi, Shoham (IL); Mordehai Margalit, Zichron Yaaqov (IL)

(73) Assignees: SONICEDGE LTD., Shoham (IL); JACOB JENSEN DESIGN A/S, Hoejslev (DK)

( * ) Notice: Subject to any disclaimer, the term of this patent is extended or adjusted under 35 U.S.C. 154(b) by 152 days.

(21) Appl. No.: 18/508,289

(22) Filed: Nov. 14, 2023

(65) Prior Publication Data

US 2024/0163599 A1 May 16, 2024

Related U.S. Application Data

(60) Provisional application No. 63/424,968, filed on Nov. 14, 2022.

(51) Int. Cl.
*H04R 1/10* (2026.01)

(52) U.S. Cl.
CPC ........... *H04R 1/105* (2013.01); *H04R 1/1016* (2013.01)

(58) Field of Classification Search
CPC .............................. H04R 1/105; H04R 1/1016
See application file for complete search history.

(56) References Cited

U.S. PATENT DOCUMENTS

| | | | | |
|---|---|---|---|---|
| 8,744,111 | B2 * | 6/2014 | Chu | H04R 1/1091 381/372 |
| 8,861,752 | B2 | 10/2014 | Margalit | |
| 10,284,961 | B2 | 5/2019 | Margalit | |
| 10,477,307 | B1 * | 11/2019 | Zhang | H04R 1/44 |
| 10,542,359 | B2 * | 1/2020 | Singer | H04R 25/60 |
| 11,564,025 | B2 * | 1/2023 | Blundell | H04R 1/44 |
| 11,729,542 | B2 * | 8/2023 | Carlile | H04R 1/1058 381/74 |
| 11,991,495 | B2 * | 5/2024 | Staerke | H04R 25/656 |
| 2008/0146890 | A1 * | 6/2008 | LeBoeuf | A61B 5/4839 600/300 |
| 2010/0034407 | A1 * | 2/2010 | Petrausch | H04R 25/45 381/318 |
| 2013/0044904 | A1 * | 2/2013 | Margalit | H04R 31/00 381/182 |
| 2013/0066636 | A1 * | 3/2013 | Singhal | H04R 1/32 381/385 |
| 2015/0382123 | A1 * | 12/2015 | Jobani | H04R 1/1016 700/98 |
| 2016/0249133 | A1 * | 8/2016 | Sørensen | A61B 5/6817 |
| 2017/0127198 | A1 * | 5/2017 | Hagen | H04R 1/105 |

(Continued)

*Primary Examiner* — Oyesola C Ojo

(74) *Attorney, Agent, or Firm* — Manelli Selter PLLC; Edward Stemberger

(57) ABSTRACT

Earphones are configured to include an ear-tip to accommodate insertion into an ear canal and provide a leak free or low leakage acoustic connection between a speaker embedded in the earphone body and the ear. The earphone in this disclosure is further configured to attach to an earphone support member which provides either mechanical or user functionality to the earphone.

8 Claims, 11 Drawing Sheets

(56) References Cited

U.S. PATENT DOCUMENTS

| | | | | |
|---|---|---|---|---|
| 2018/0035196 | A1* | 2/2018 | Yeung | H04R 1/1058 |
| 2018/0146279 | A1* | 5/2018 | Wang | H04R 1/1016 |
| 2018/0184192 | A1* | 6/2018 | Na | H04R 1/1091 |
| 2018/0332379 | A1* | 11/2018 | Mcgarry | H04R 1/1058 |
| 2019/0208304 | A1* | 7/2019 | Cohen | H04R 1/1058 |
| 2020/0029147 | A1* | 1/2020 | Chou | H04R 1/1075 |
| 2020/0245049 | A1* | 7/2020 | Karayiannis | H04R 1/1041 |
| 2021/0258673 | A1* | 8/2021 | Lu | H04R 1/1016 |
| 2021/0321187 | A1* | 10/2021 | Imamura | H04R 1/1066 |
| 2022/0386015 | A1* | 12/2022 | Li | H04R 1/1058 |
| 2022/0417634 | A1* | 12/2022 | Seangly | G06F 30/17 |
| 2023/0224617 | A1* | 7/2023 | Bacon | H04R 1/1016 381/328 |
| 2023/0254623 | A1* | 8/2023 | Loeliger | H04R 1/24 381/380 |
| 2024/0121538 | A1* | 4/2024 | Shen | H04R 1/02 |
| 2024/0398240 | A1* | 12/2024 | Zhang | G01K 13/20 |

* cited by examiner

EARPHONE SYSTEM

BACKGROUND

State of art wireless earphones are referred to as TWS. True Wireless Stereo earphones. The earphone is designed to fit into the entrance of the ear canal and includes two elements an earphone body and an ear-tip. An earphone body comprising of at least a speaker, a microphone and communication and control module which receives wireless audio transmission, audio input from the microphones and generates drive signals to operate the speaker. An ear-tip is a flexible unit configured to accommodate a partial insertion of at least a part of the earphone body into an ear canal and ensure a sealed or partially sealed acoustic channel between the ear canal and the speaker located in the earphone.

U.S. Pat. No. 8,861,752 describes a speaker device for generating audio signals which has several unique features; the speaker is a volume velocity source, enabling enhanced performance from a very small form factor; reduced back cavity; low cost; high electrical to acoustical conversion efficiency leading to reduced power consumption by the speaker device. In U.S. Pat. No. 8,861,752 the speaker device is operated with two electrical connections and a common ground. The audio signal is generated from the electrical signals operating the device.

The small size of the speaker and back cavity enable creating much smaller earphones bodies opening new opportunities in earphone design. One challenge of a smaller earphone body relates to securing the earphone in the ear and ensuring it does not move or fall during extended use. This disclosure describes a novel earphone comprising of an additional interchangeable element to overcome the limitation of existing art.

SUMMARY

Some embodiments of the present disclosure may generally relate to a speaker device that includes at least one membrane and shutter. The membrane is positioned in a first plane and configured to oscillate along a first directional path and at a first frequency effective to generate an ultrasonic acoustic signal. The shutter is positioned in a second plane that is substantially separated from the first plane. The shutter is configured to modulate the ultrasonic acoustic signal such that an audio signal is generated. The speaker device is connected to a driver device where the driver device supplies at least two electrical signals to operate the speaker device at least one membrane and shutter respectively. The driver device receives an input audio signal from which it generates a modulated audio signal to operate the membrane and generate an ultrasonic modulated signal. The driver further operates the shutter at the modulation frequency to demodulate the ultrasonic modulated signal and generate an acoustic audio signal.

Other embodiments of the present disclosure may generally relate to an earphone comprised of at least three elements; an ear-tip; an earphone body; an earphone support member. In one example, the earphone support member is detachable from the earphone body. In a further example the earphone support member may include any of but not limited to; a battery; an image sensor; one or more acoustic sensors; one or more speakers; one or more acoustic transducers; one or more light sources; one or more ornamental elements. In a further example an earphone support member is designed to enhance the attachment of the earphone to an ear.

The foregoing summary is illustrative only and is not intended to be in any way limiting. In addition to the illustrative aspects, embodiments, and features described above, further aspects, embodiments, and features will become apparent by reference to the drawings and the following detailed description.

GLOSSARY

- "audio signals" as used in the current disclosure means sound pressure waves ranging from 10 Hz to 45K Hz.
- "audio generating device" or "speaker"—as used in the current disclosure means a device to generate audio signals.
- "acoustic signal" as used in the current disclosure means sound pressure waves ranging from 20 Hz to 5 MHz.
- "acoustic transducer" as used in the current disclosure means a device to generate audio or ultrasound signals.
- "controller" or "electronics integrated circuit"—as used in the current disclosure means a device that receives and outputs analog or digital electrical signals and includes logic or microprocessor units to process the input or output signals.
- "drive signal"—as used in the current disclosure means an electric analog signal. One or more of the drive signals are used to operate an audio generating device.
- "analog signal"—as used in the current disclosure means a time varying electric analog signal which can have any voltage or current value within a range of values.
- "digital signal"—as used in the current disclosure means a time varying electric digital signal which can have either of two voltage or current values.
- "audio system" as used in the current disclosure means a system for generating audio signals and in some examples includes one or more audio generating devices and one or more controllers.
- "background sound signals" or "background noise" as used in the current disclosure means audio signals which are present when the audio system is not operating.
- "communication bus" as used in the current disclosure means a means of communicating between one or more devices. Communication buses are any of but not limited to; wire; multiple wires; wireless; optical and others.
- "power bus" as used in the current disclosure means a method or providing electrical power to one more audio generating devices.
- "earphone" or "TWS" as used in the current disclosure means an acoustic device configured to be attached to an ear and to generate an audio signal. In some configurations an earphone further includes one or more microphones to detect an audio signal and a communication and control unit to enable wireless control of the earphone.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

DETAILED DESCRIPTION

Figure 1:
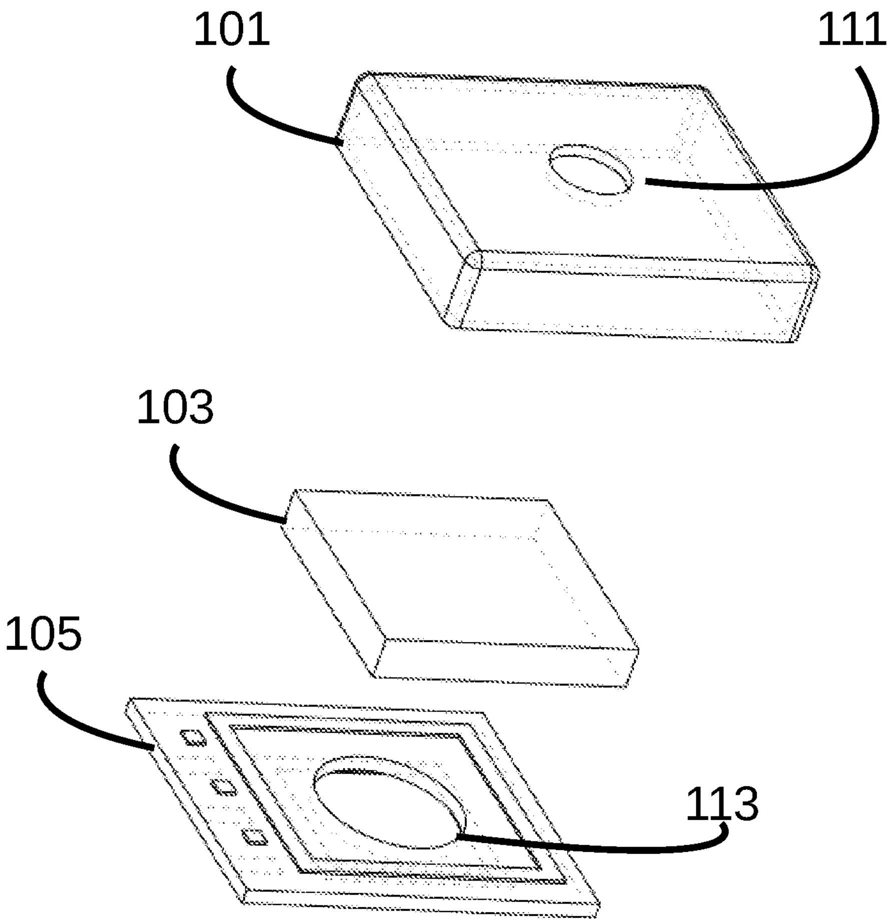
FIG. 1 is an example of a state of art audio generating device as described in U.S. Pat. No. 8,861,752.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other examples may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure. This disclosure is drawn, inter alia, to methods, apparatus, computer programs, and systems of generating an audio signal.

FIG. 1 is an example of a state of art speaker or audio generating device as described in U.S. Pat. No. 8,861,752. An audio generating device includes but is not limited to an audio generating transducer (103) which is operated by two drive signals. In U.S. Pat. No. 8,861,752, audio generating transducer (103) generates audio by generating and subsequently modulating an ultrasound signal. In one example audio generating transducer (103) includes a plurality of membranes for generating an ultrasound signal and a plurality of acoustic shutters for modulating the ultrasound signal and generating an audio signal. In one example the audio generating transducer is a micro electro mechanical device (MEMS) and manufactured using semiconductor manufacturing processes. In a further example an audio generating device includes a substrate (105) and a lid (101). Examples of substrates include but are not limited to; PCB; laminates; Ceramic; Silicon; Glass; polymer; Silicone. A substrate may include metal traces for electrical connection or for adhesion of the audio generating transducer (103) and/or lid (101) to the substrate. Examples of lids include but are not limited to metal; liquid crystal polymer; polymer; glass; silicon; ceramic. Lids may be electroplated or otherwise have an internal and/or external metal layer or layers. In a further example one or more acoustic ports (111, 113) are located on either or both substrate (105) or lid (101). Acoustic ports (111, 113) can further be located at the sides of the audio generation device. In one example an acoustic port (111) is located at the lid side panel to facilitate an acoustic port configured for insertion into the ear canal of a user.

Figure 2:
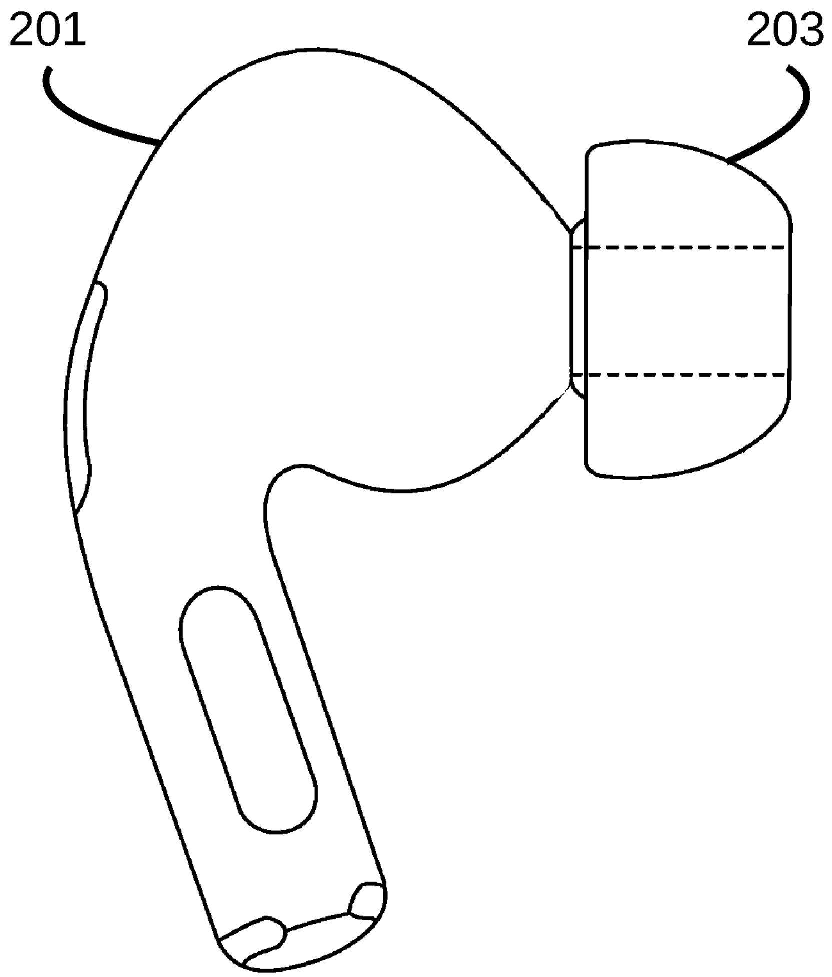
FIG. 2 is an example of state of art earphone comprising of earphone body and ear-tip.

FIG. 2 is an example of state of art earphone comprising of earphone body (201) and ear-tip (203). An earphone body is comprised of at least a speaker, a microphone, a battery, one or more sensors, one or more electronic chip configured to receive a wireless audio signal and drive the speaker. Examples of earphone bodies include; bean shaped, stemmed, round or square. An ear-tip (203) is configured to attach to the earphone body and facilitate introduction into a user's ear. An ear-tip (203) is made from elastic material such as Silicone. In a further example an ear-tip (203) may have different sizes to facilitate fit to different ear canals. In a further example an ear-tip (203) is configured to seal or partially seal the users ear canal.

Figure 3A:
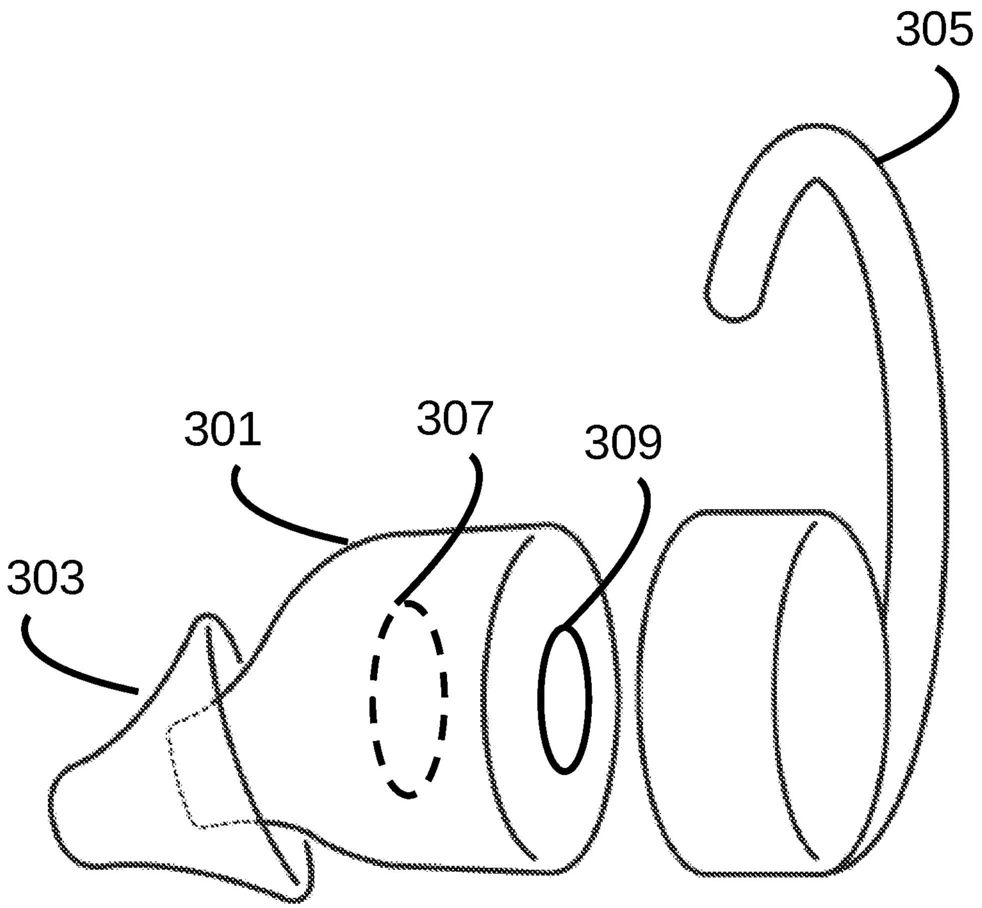
FIG. 3A is an example of an earphone comprising of earphone body, ear-tip and detached support member.
Figure 3B:
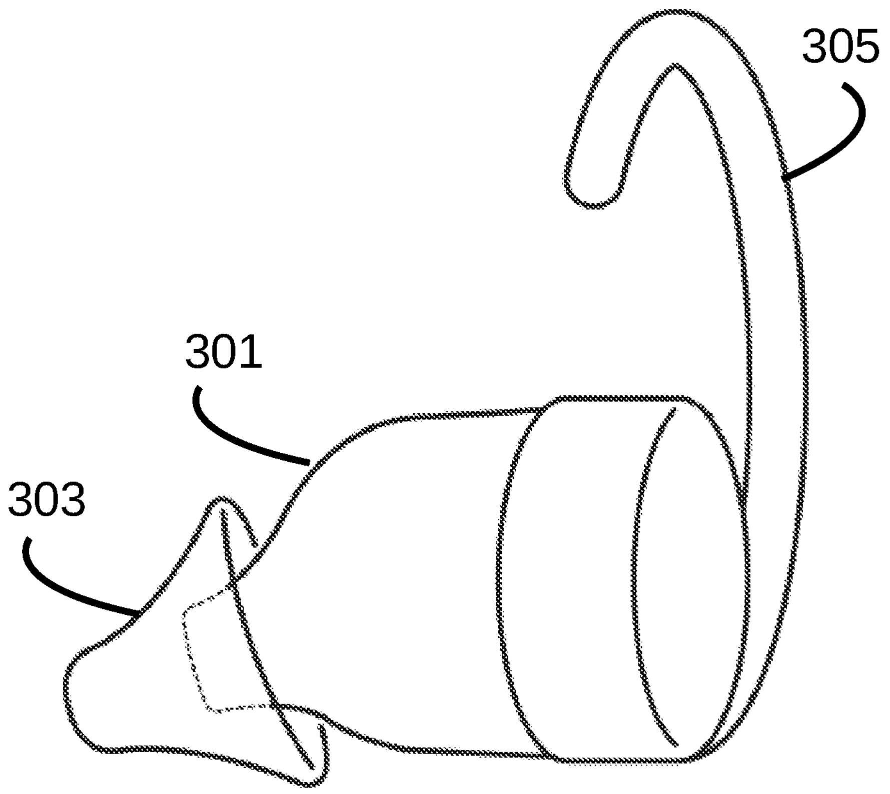
FIG. 3B is an alternative example of an earphone comprising of earphone body, ear-tip and attached support member.

FIGS. 3A and 3B are an example of an earphone as described in this application, comprising of earphone body (301), ear-tip (303) removably connected to the ear tip (303) and configured to be received an entrance of an ear canal and support member (305). The earphone body (301) preferably includes the features mentioned above with regard to earphone body (201) and includes at least an audio generating transducer or speaker (307), such as that disclosed in FIG. 1. In FIG. 3A the support member (305) is detached from the earphone body (301) and in FIG. 3B the support member (305) is attached to the earphone body (301). Detachable connection structure (309) is configured to facilitate attachment and detachment of earphone body (301) to support member (305). Examples of the detachable connection structure (309) include but are not limited to; magnetic attachment where magnets attached to either support member (305) and/or earphone body (301) or magnets attached to one off support member (305) or earphone body (301) and ferromagnetic material attached to the second item; mechanical attachment consisting of any of but not limited to one or more fasteners; one or more screw attachments; support by friction. In an alternative example a support member (305) may be attached by fastening or screwing it to an earphone body (301). As described in the following sections the support member (305) provides any off but not limited the following functions; mechanical support for earphone in ear; energy source including a battery or antenna for power reception; one or more sensors; ornamental functionality; light, sound or ultrasound emission or combinations of these functions.

Figure 3C:
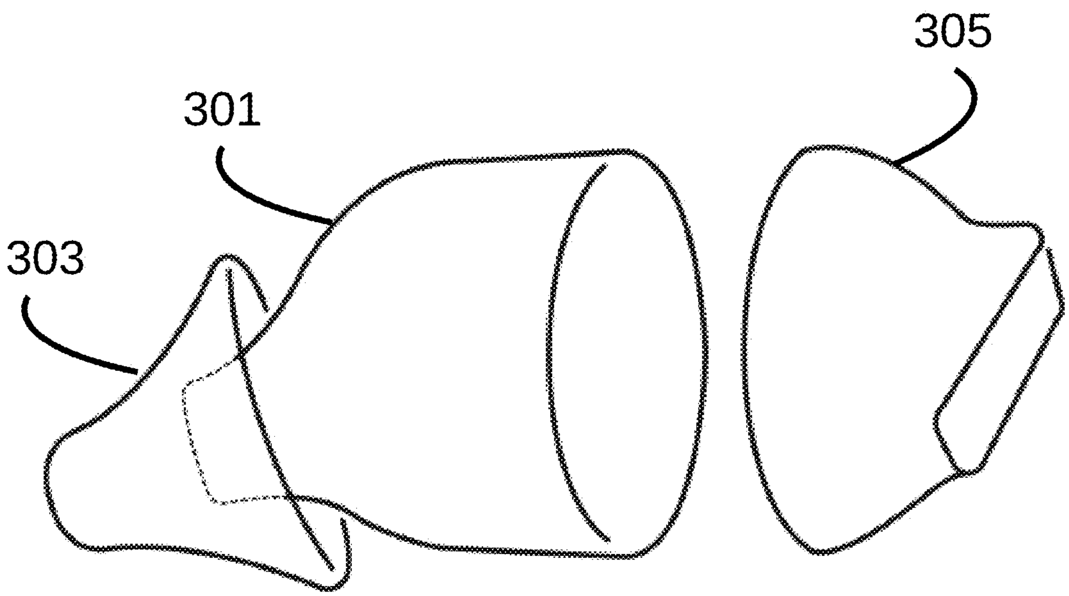
FIG. 3C is an alternative example of an earphone comprising of earphone body, ear-tip and detached support member.
Figure 3D:
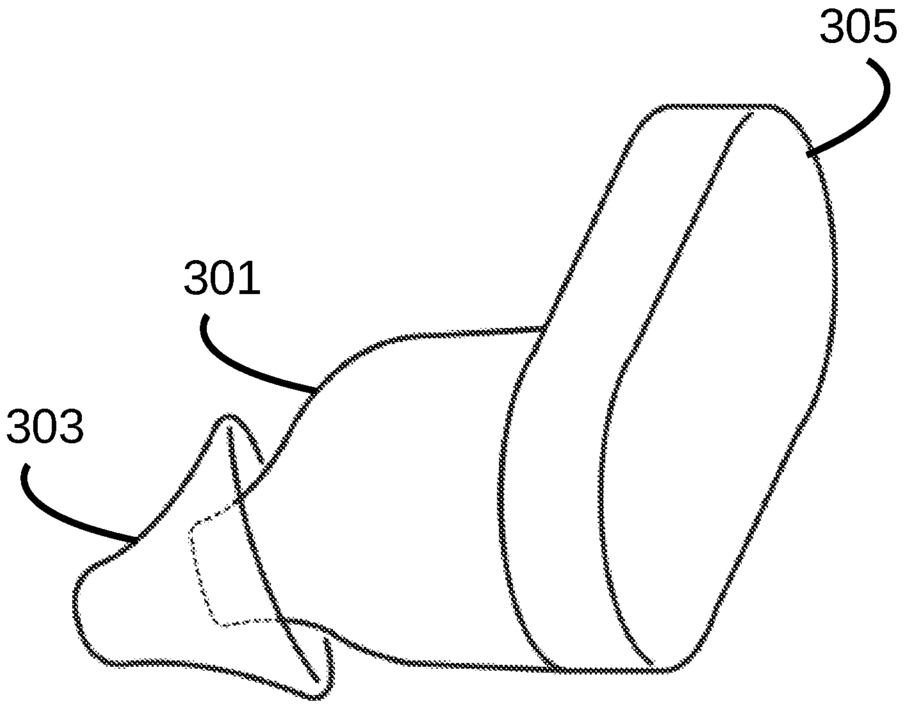
FIG. 3D is an alternative example of an earphone comprising of earphone body, ear-tip and attached support member.

FIG. 3C is an example of an earphone comprising of earphone body (301), ear-tip (303) and an alternative detached support member (307). FIG. 3D is an example of an earphone comprising of earphone body (301), ear-tip (303) and a further alternative attached support member (305).

Figure 4:
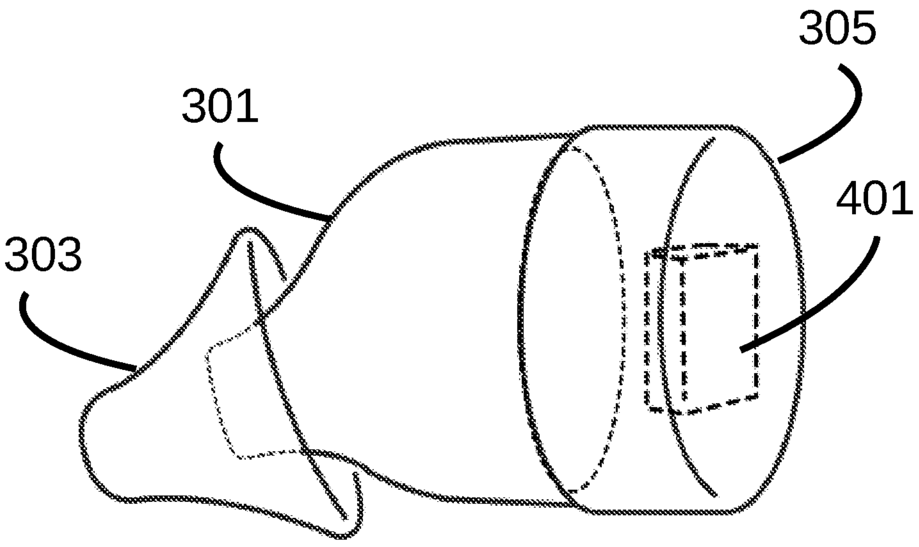
FIG. 4 is an example of an earphone comprising of earphone body, ear-tip and support member with a sensor in the support member.

FIG. 4 is an example of an earphone comprising of earphone body (301), ear-tip (303) and support member (305) with a sensor (401) in the support member (305). Examples of sensor (401) include but are not limited to; image sensor; image sensor or 3D sensor for gesture recognition; time of flight sensor; IR sensor; acoustic sensor;

microphone; vibration sensor; gyro meter; acceleration sensor; temperature sensor; pressure sensor; or combinations of these sensors. A sensor (401) located in the support member (305) provides functionality beyond the functionality of the earphone body. For example a support member (305) can provide any of but not limited to additional functionality of; gesture recognition where hand gestures operate functionality of the earphone; additional sound pickup capabilities extending the location of one or more microphones to provide enhanced noise suppression or sound pickup; acceleration detection providing noise suppression using bond based acoustic conduction; acceleration and rotation detection to support 3D sound and sound localization in relation to earphone movement. In additional examples a support member (305) contains functionality relating to specific roles and can be exchanged based on the roles. In a further example, in addition or instead of sensors a support member (305) contains electronic circuitry configured to enhance the functionality of the earphone. For example; enhanced hearing for conferences; biometric measurements for sports; AI assistant for personal training. In a further example one or more electrical connections provide a data bus and/or power bus from the support member (305) to the earphone body (301). The power and/or data bus enable the sensor or electronics in the support member (305) to function and to provide responses or electronic signals representing responses or sensor functions to the earphone electronic components. In an alternative example the data and/or power bus are wireless and enabled by NFC transmission.

Figure 5:
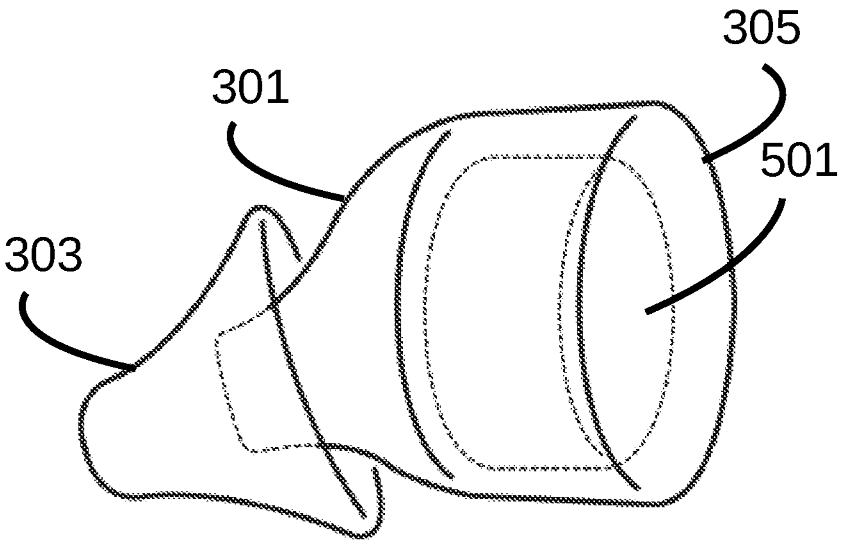
FIG. 5 is an example of an earphone comprising of earphone body, ear-tip and support member with a battery in the support member.

FIG. 5 is a further example of an earphone comprising of earphone body (301), ear-tip (303) and support member (305) with a battery (501) in the support member. The battery (501) provides power for the support member (305) and/or earphone body (301). In one example the battery extends the operation of the earphone. In another example, a battery (501) in the support members augments a smaller batter in the earphone enabling to hot swap the support member (305) without stopping the earphone operation. To facilitate transfer of power from battery (501) to earphone body (301), support member (305) and earphone body (301) share a power connection. Examples of power connections include and are not limited to; wired connection; wireless connection such as NFC. In a further example the teachings of FIG. 4 and FIG. 5 are combined.

Figure 6:
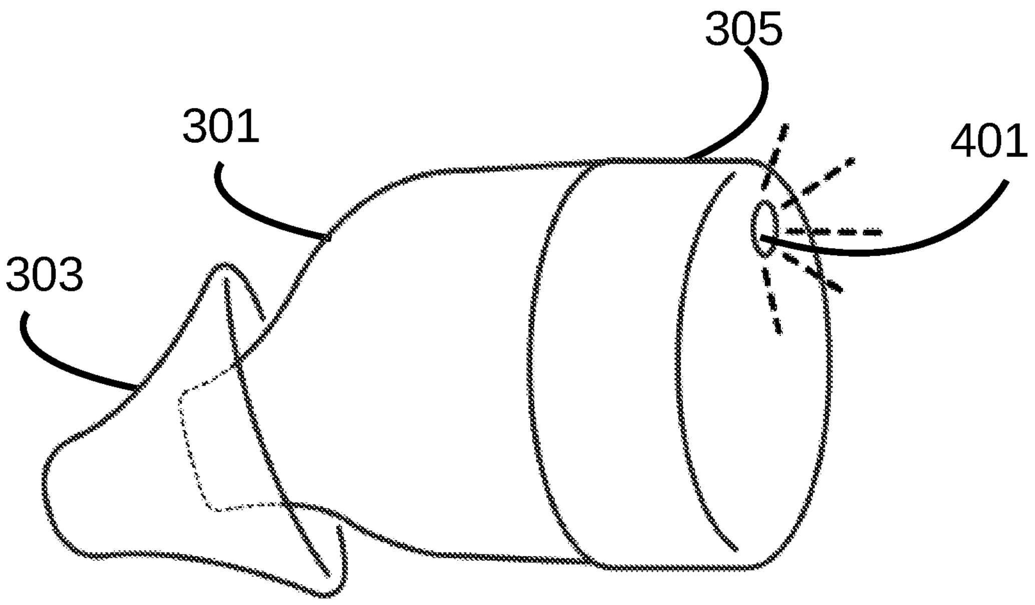
FIG. 6. is an example of an earphone comprising of earphone body, ear-tip and support member with a one or more light or sound sources.

FIG. 6 is an example of an earphone comprising of earphone body (301), ear-tip (303) and support member (305) with a one or more light (601) or sound sources (601). Light and/or sound sources (601) emit light and our sound. Light emission can be used for functional or ornamental functions. Examples of functions include but are not limited to displaying a light or light pattern when; user is in communication with one or more users; listening to music; listening to podcasts; in physical activity; intensity of activity; body status; heart rate or variability; body temperature; mood; hydration. Additional functions include device to device communication using light, sound or ultrasound; measurement of external temperature using sound and measuring airspeed; indications and cues in video conferencing.

Figure 7:
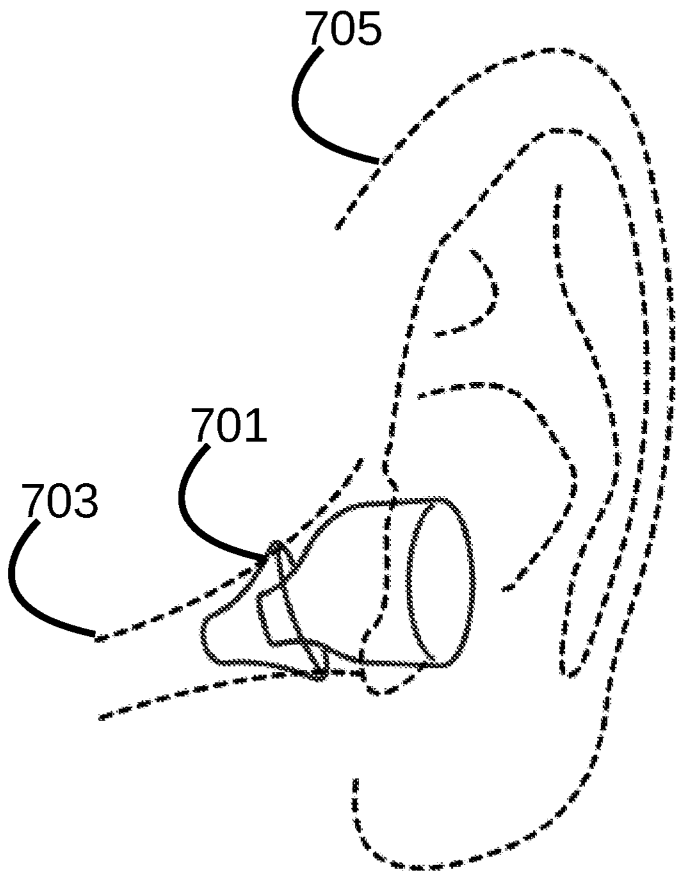
FIG. 7 is an example of an earphone body configured accommodate an audio device in the ear canal.

An important aspect of audio generation device described in FIG. 1, is the small size of the device enabling a smaller speaker which can be configured to fit into the ear canal. FIG. 7 is an example of an earphone body (301) configured to accommodate an audio device in the ear canal. Location of the audio generating device in the ear canal reduces the active volume of air, and increase the sound pressure level. Hence inserting the audio generating device deeper in the ear canal provides enhanced sound pressure level and better user experience. In this configuration, the support member provides important functionality in insertion; removal and proper positioning of the earphone in a user's ear.

Figure 8:
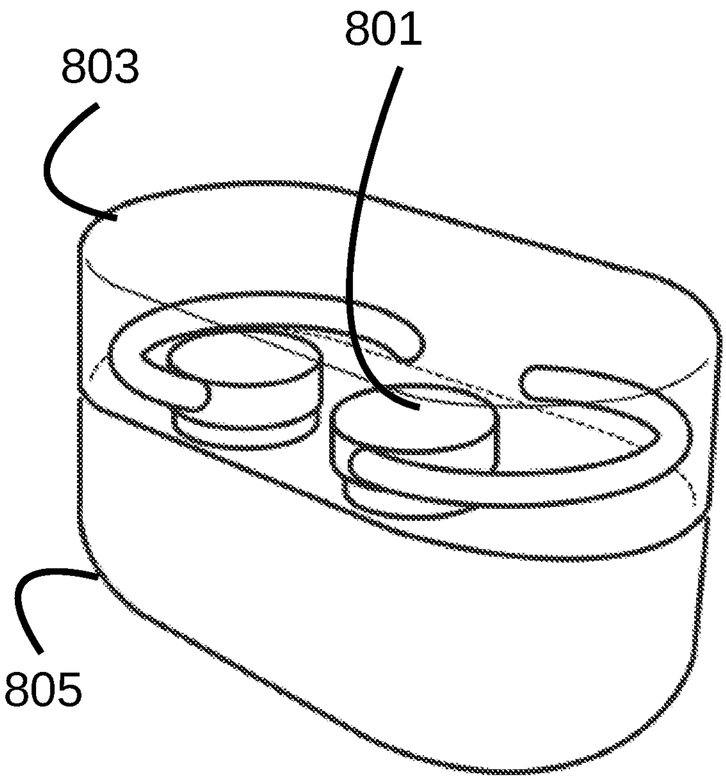
FIG. 8 is an example of an earphone case configured to accommodate an earphone set and one or more support members; all arranged in accordance with at least some embodiments of the present disclosure.

FIG. 8 is an example of an earphone case (805) configured to accommodate an earphone set (801) and one or more support members. By using a smaller earphone and support member, an earphone case can be designed to be any off but not limited to; smaller in size; flat; supporting charging of multiple support members and at least two earphones. In another example an earphone case may be part of a cellphone; laptop; tablet; automobile or other user device. To sum we describe an earphone comprised of an earphone tip; an earphone member; an earphone body configured to accommodate on one side of the earphone a detachable connection of an earphone tip and on a second side of the earphone body a detachable connection of an earphone member. In a further example the detachable connection of an earphone member is any of but not limited to, mechanical fastener, magnetic attachment, screw, friction, or combination of these. In a further example an earphone member includes any of but not limited to a battery; a sensor; a light source; a sound source; any combination of these. In a further example an earphone member has one or more electric connections to the earphone body wherein any of said connections provides any of but not limited to; power; communication; interlock; or combination of these. In a further example an earphone member has a wireless connection to the earphone body providing either communication and/or power.

In an alternative example an earphone comprising an earphone tip; an earphone member; an earphone body configured to accommodate on one side of the earphone a detachable connection of an earphone tip and on a second side of the earphone body a detachable connection of an earphone member; and wherein the earphone tip comprising of a flexible material and attached to the earphone body using mechanical friction. In a further example the detachable connection of an earphone member is any of but not limited to, mechanical fastener, magnetic attachment, screw, friction, or combination of these. In a further example an earphone member includes any of but not limited to a battery; a sensor; a light source; a sound source; any combination of these. In a further example an earphone member has one or more electric connections to the earphone body wherein any of said connections provides any of but not limited to; power; communication; interlock; or combination of these. In a further example an earphone member has a wireless connection to the earphone body providing either communication and/or power.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An earphone comprising:

an earphone body;

an earphone tip removably connected to a first end of the earphone body and configured to be received in an entrance of an ear canal;

an earphone support member; and detachable connection structure configured to detachably connect the earphone support member to a second end of the earphone body, wherein the detachable connection structure comprises a magnetic attachment, wherein the earphone support member includes at least a sensor embedded therein.

2. The earphone of claim 1, wherein the earphone support member further includes at least one of a battery; a light source; a sound source; any combination of these.

3. The earphone of claim 1, wherein the sensor comprises at least one of an image sensor; an image sensor or 3D sensor for gesture recognition; a time of flight sensor; an IR sensor; an acoustic sensor; a microphone; a vibration sensor; a gyro meter; an acceleration sensor; a temperature sensor; a pressure sensor; or combinations of these sensors.

4. The earphone of claim 1, wherein the earphone support member has one or more electric connections to the earphone body, wherein any of said connections provides at least power; communication; interlock; or combination of these.

5. The earphone of claim 1, wherein the earphone support member has a wireless connection to the earphone body providing either communication and/or power.

6. The earphone of claim 1, wherein the earphone body comprises a speaker.

7. The earphone of claim 6, wherein the speaker is an audio generating transducer in the form of a micro electo mechanical device (MEMS).

8. An earphone comprising:

an earphone body;

an earphone tip removably connected to a first end of the earphone body and configured to be received in an entrance of an ear canal;

an earphone support member; and detachable connection structure configured to detachably connect the earphone support member to a second end of the earphone body, wherein the earphone tip comprises of a flexible material and is attached to the earphone body using mechanical friction, wherein the detachable connection structure comprises a magnetic attachment, and wherein the earphone support member includes at least a sensor embedded therein.

* * * * *